Oct. 4, 1955
C. L. HAMMEL
2,719,399
WINDROW LIFTER
Filed Aug. 2, 1954
2 Sheets-Sheet 2
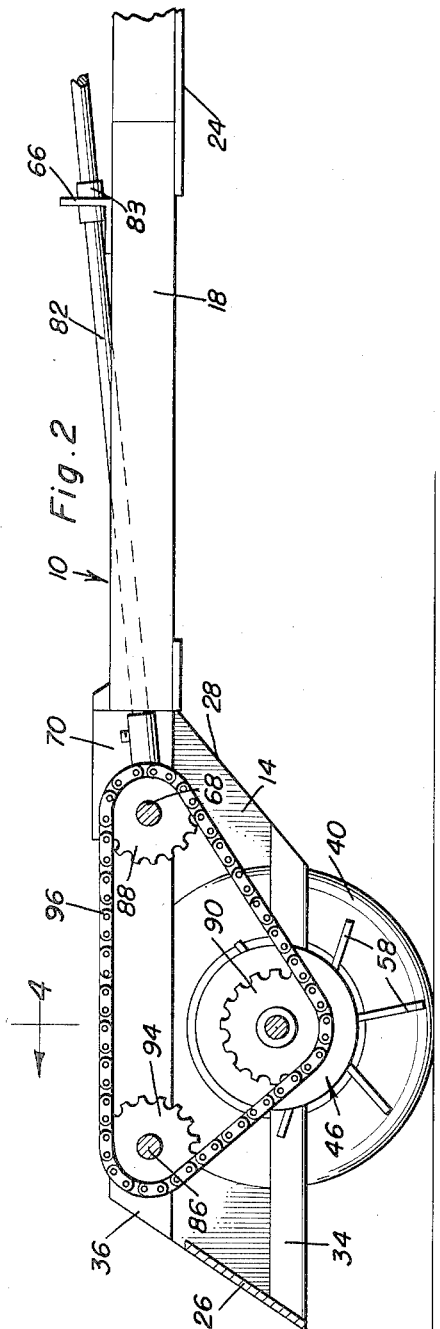
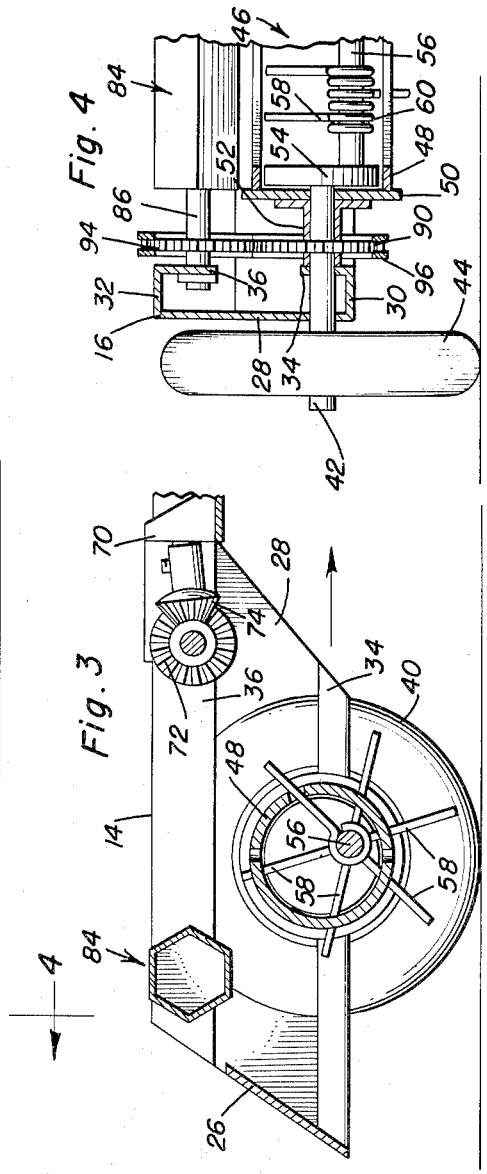
Carl L. Hammel
INVENTOR.
BY *Clarence A. O'Brien
and Harvey B. Jacobson*
Attorneys

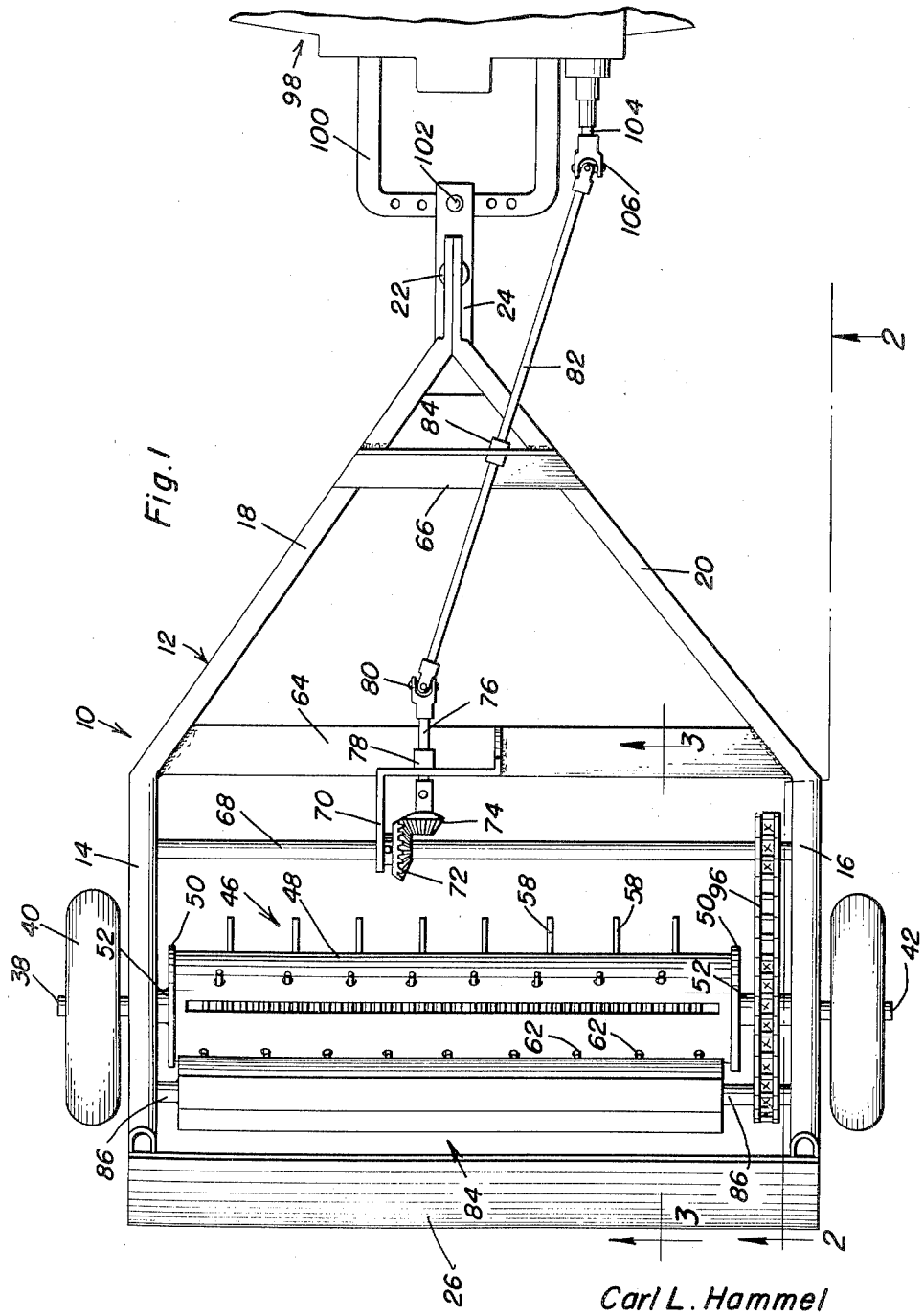

United States Patent Office 2,719,399
Patented Oct. 4, 1955

2,719,399

WINDROW LIFTER

Carl L. Hammel, Eyota, Minn.

Application August 2, 1954, Serial No. 447,275

3 Claims. (Cl. 56—27)

This invention relates in general to improvements in agricultural implements, and more specifically to a windrow lifter.

After the grain has been windrowed the cut grain is left on the ground in windrows for drying. However, often times rain falls on the windrowed grain with a result it has a tendency to grow green and rot. The windrowed grain must then be lifted and reformed so that all of the grain and straw may be suitably aerated and dried. Inasmuch as the farmer is generally occupied with other tasks and since this must be done as soon as possible, it is obvious that it is highly desirable that there be provided a windrow lifter which will operate at a maximum speed. At the present time the windrow lifters are of such a nature whereby they must be drawn at a relatively slow speed.

Therefore, it is the primary object of this invention to provide an improved windrow lifter which is so constructed whereby it may be driven along windrows at a relatively high speed and at the same time be extremely effective.

The normal windrow lifter is so constructed whereby the lifting mechanism thereof is driven from the wheels of the supporting frame. However, when drawn at a relatively high speed wheels have a tendency to slip and bounce with the result that the lifting mechanism is not properly driven. Therefore, it is a further object of this invention to provide an improved windrow lifter which has the mechanism thereof connected in driving relation to the power take-off shaft of the drawing tractor so that the lifting mechanism is driven at a constant rate compared with the rate of travel with the windrow lifter over the ground.

A still further object of this invention is to provide an improved windrow lifter which is driven from the drawing tractor and which includes both a lifting roll for receiving straw and the like from the lifting or pick up fingers and for completely aerating the straw and depositing it back on the ground rearwardly of the windrow lifter.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is a top plan view of the windrow lifter which is the subject of this invention and shows the same connected to a rear portion of a conventional tractor, the connection of the drive shaft of the windrow connector with respect to the power take-off shaft of the tractor being clearly illustrated;

Figure 2 is an enlarged fragmentary longitudinal sectional view taken substantially upon the plane indicated by the section line 2—2 of Figure 1 and shows the specific drive connection between a transverse drive shaft, a rotating lifting drum and a lifting roll of the windrow lifter;

Figure 3 is an enlarged fragmentary longitudinal vertical sectional view taken substantially upon the plane indicated by the section line 3—3 of Figure 1 and shows the specific construction of the lifting drum and lifting fingers of the windrow lifter; and Figure 4 is an enlarged fragmentary transverse vertical sectional view taken substantially upon the plane indicated by the section line 4—4 of Figure 2 and shows the manner in which the lifting drum is both supported and rotated, also being clearly illustrated is the manner in which the shaft carrying the lifting fingers is mounted in offset relation with respect to the axis of the lifting drum.

Referring now to the drawings in detail, it will be seen that there is illustrated a windrow lifter which is the subject of this invention, the windrow lifter being referred to in general by the reference numeral 10. The windrow lifter 10 includes a frame which is referred to in general by the reference numeral 12.

The frame 12 is formed by a pair of longitudinally extending frame rails 14 and 16 which have inwardly converging forward portions 18 and 20, respectively. The forward ends of the frame rails 14 and 16 are connected together by suitable fastening means 22 and has secured to the underside thereof a hitch bar 24. The rear ends of the frame rails 14 and 16 are connected together by a combined rear transverse frame member and straw slide plate 26.

As is best illustrated in Figure 4, the frame rail 16 is C-shaped in cross section and includes a vertical web 28, a lower flange 30, an upper flange 32 and opposed lower and upper, vertically disposed inner flanges 34 and 36, respectively. The frame rail 14 is identical in construction with the frame rail 16 and need not be set forth in more detail here.

Rigidly carried by the frame rail 14 is an axle 38. The axle 38 extends through the web 28 in lower vertical flange 34 of the frame rail 14 and is fixedly secured thereto. The axle 38 projects both inwardly and outwardly of the frame rail 14 and has rotatably mounted on the outer portion thereof a rear wheel 40.

As is best illustrated in Figure 4, a second axle 42 is rigidly secured to the lower part of the frame rail 16. The axle 42 extends through the web 28 and lower vertical flange 34 of the frame rail 16 and has rotatably mounted on the outer portion thereof a second wheel 44.

As is best illustrated in Figure 1, the axles 38 and 42 are disposed in transverse alignment. Extending between and rotatably carried by the inner portions of the axles 38 and 42 is a lifting drum 46. The lifting drum 46 includes a tubular central portion 48 which has secured to opposite ends thereof by suitable fastening means enlarged end plates 50. The end plates 50 include outwardly projecting hubs 52 in which are received the inner ends of the axles 38 and 42, the hubs 52 being rotatable on the axles 38 and 42, to rotatably support the lifting drum 46.

As is best illustrated in Figures 3 and 4, secured to the inner ends of the axles 38 and 42 are plates 54 which are disposed within the cylindrical portion 48 of the lifting drum 46. Secured to the inner surfaces of the plates 54 and extending therebetween is an offset shaft 56. The shaft 56 is disposed below and slightly forwardly of the longitudinal axis of the lifting drum 46, which is coaxial with the axes of the axles 38 and 42.

Carried by the offset shaft 56 is a plurality of lifting or pick-up fingers 58. Each of the fingers 58 includes an eye 60 at its inner end which is suitably journalled on the offset shaft 56.

The cylindrical portion 48 of the lifting drum 46 is provided with a plurality of openings 62 through which the lifting fingers 58 project. The openings 62 are arranged in circumferentially spaced, longitudinal rows and adjacent openings 62 are both circumferentially and longitudinally spaced relative to each other so that the lifting fingers 58 are staggered relative to each other and thereby provide a continuous lifting operation.

The frame 12 includes a transverse intermediate frame member 64 which extends between the converging portions 18 and 20 at their connection to the main portions of the frame rails 14 and 16. The forward parts of the converging portions 18 and 20 are also connected together by a forward transverse frame member 66.

Extending transversely between the forward parts of the main portions of the frame rails 14 and 16 and suitably journalled therein is a transverse drive shaft 68. The drive shaft 68 is supported intermediate its ends by a Z-shaped bracket 70 which has a major portion thereof and overlying and secured to intermediate frame member 64. Disposed immediately adjacent the Z-shaped bracket 70 and carried by the shaft 68 for rotation is a first bevel gear 72. A second bevel gear 74 is in meshing engagement with the bevel gear 72 and carried by a drive shaft 76. The drive shaft 76 is suitably journalled in a bearing 78 in the Z-shaped bracket 70 and has the forward end thereof connected by a universal joint 80 to a drive shaft extension 82. The drive shaft extension 82 is journalled intermediate its ends in a bearing 83 carried by the forward frame member 66.

In order that straw or the like lifted by the lifting fingers 58 may be further aerated and deposited on the ground in a loose state, there is provided a lifting roll which is referred to by the reference numeral 84. The lifting roll 84 is polygonal in cross section, as is best illustrated in Figure 3 and includes axle portions 86 which are suitably journalled in the upper vertical flanges 36 of the frame rails 14 and 16.

As is best illustrated in Figures 1 and 2, the transverse drive shaft 68 is provided with a drive element in the form of a sprocket 88. The sprocket 88 is longitudinally aligned with a driven element in the form of a sprocket 90 carried by the hub 52 of the lifting drum 46 which is disposed adjacent the frame rail 16. A second driven element in the form of a sprocket 94 is carried by the axle portion 86 of the lifting roll 84 disposed adjacent the frame rail 16. Entrained over the sprockets 88, 90 and 94 is a drive member in the form of a drive chain 96.

Referring once again to Figure 1 in particular, it will be seen that there is illustrated a rear portion of a conventional farm tractor which is referred to in general by the reference numeral 98. The farm tractor 98 includes a draw bar 100 to which the plate 94 is suitably connected by a drawn pin 102.

The tractor 98 also includes a power take-off shaft 104. The power-take-off shaft 104 has connected thereto the drive shaft extension 82 by a suitable universal joint 106.

From the foregoing description of the invention, it is readily apparent that when the windrow lifter 10 is drawn behind the tractor 98 and the power take-off shaft 104 is driven in the customary manner, the lifting drum 46 and the lifting roll 84 will be rotated simultaneous with the movement of the frame 12 over the windrow but independently of such movement. Inasmuch as the lifting mechanism of the windrow lifter 10 is positively driven through the power take-off shaft 104 it will be seen that the rate of driving of the lifting mechanism may be retained at any desired rate with respect to the rate of travel over the windrow to be lifted.

In operation, the lifting drum 46 is rotated with the result that the lifting fingers 58 engage the straw or the like to be lifted and turned and raises it upwardly and forwardly over the lifting drum 46. The fingers 58 project through the drum the most when adjacent the ground and the least when remote from the ground so as to automatically release the straw upon reaching the uppermost position. The straw is then received by the lifting roll 84 which then lifts it up and over the roll and down over the slide plate 26 where the straw is again dropped onto the ground. It is readily apparent that the straw will be properly aerated and loosely dropped on the ground for proper drying by the windrow lifter 10.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly, all suitable modifications and equivalents may be resorted to, falling within the scope of the appended claims.

What is claimed as new is as follows:

1. A windrow lifter comprising a frame adapted to be drawn behind a tractor, said frame including a pair of oppositely disposed parallel frame rails, opposed fixed stub axles carried by said rails and having inner and outer end portions extending therethrough, wheels mounted on the outer end portions of said axles, a drum extending between and rotatably journaled at opposite ends on the inner end portions of said axles, an offset shaft fixedly mounted within said drum and supported by said axles in an offset forward parallel relationship to the longitudinal axis of said drum, flexible lifting fingers rotatably carried on said fixed shaft and extending through staggered longitudinally spaced openings in said drum, power driven means carried on said frame and operatively connected to said drum for rotating said drum, the rotary movement of said drum progressively moving said fingers inwardly and outwardly of said drum for carrying harvested material rearwardly over the top of said drum, a rotary stripping and lifting roll extending in parallel relation to said drum and supported in rearward and raised relation thereto, and a crop discharge plate disposed rearwardly and below said stripping and lifting roll for receiving harvested material passing thereover and discharging the same onto the ground.

2. A windrow lifter as set forth in claim 1 wherein said stripping and lifting roll and said drum each is operatively connected to the power driven means for simultaneous rotation of said drum and stripping and lifting roll.

3. A windrow lifter as set forth in claim 2 wherein said power driven means comprises a power shaft extending between said side rails, said shaft including a drive gear for operative connection to the power take-off of a draft tractor, said power shaft including a driven gear mounted on one of the ends thereof, said drum and stripping and lifting roll each including on the ends thereof driven gears, and an endless drive member operatively connected to the respective driven gears on said drive shaft, drum and stripping and lifting roll.

References Cited in the file of this patent

UNITED STATES PATENTS

| | | |
|---|---|---|
| 2,388,212 | McElhoe et al. | Oct. 30, 1945 |
| 2,502,599 | Smart | Apr. 4, 1950 |
| 2,641,895 | Richey | June 16, 1953 |
| 2,644,292 | Oberholtz et al. | July 7, 1953 |
| 2,675,665 | Tintes et al. | Apr. 20, 1954 |
| 2,695,487 | Glienke | Nov. 30, 1954 |